United States Patent [19]

Ohmatoi

[11] Patent Number: 4,943,889
[45] Date of Patent: Jul. 24, 1990

[54] ELECTROSTATIC CAPACITOR TYPE SENSING DEVICE

[76] Inventor: Naoyuki Ohmatoi, 10-12, 2-chome, Kugenuma, Matsugaoka, Fujisawa-shi, Kanagawa-ken, Japan

[21] Appl. No.: 396,248

[22] Filed: Aug. 18, 1989

Related U.S. Application Data

[63] Continuation-in-part of Ser. No. 201,786, Jun. 3, 1988, abandoned.

[30] Foreign Application Priority Data

Jul. 3, 1989 [JP] Japan .................................. 1-171731

[51] Int. Cl.⁵ .............................................. H01G 7/00
[52] U.S. Cl. ................................................... 361/284
[58] Field of Search ................................ 361/280, 284

[56] References Cited

U.S. PATENT DOCUMENTS 3,918,306 11/1975 Maltby ............................. 361/284 X
4,295,370 10/1981 Bristol ............................. 361/284 X
4,296,630 10/1981 Jung et al. ....................... 361/284 X
4,486,811 12/1984 Kamiya et al. ....................... 361/280

*Primary Examiner*—Donald A. Griffin
*Attorney, Agent, or Firm*—Lowe, Price, LeBlanc, Becker & Shur

[57] ABSTRACT

An electrostatic capacitance type detecting device which includes a first electrode placed in the proximity of an object to be measured, a second electrode placed in the proximity of the first electrode, a film like dielectric member interposed between the first and the second electrodes, a first resistor one end of which is connected to one end of the first electrode, a second resistor one end of which is connected to one end of the second electrode, an a. c. signal generator connected to the other ends of the first and the second resistors and to the ground and a phase difference detecting means connected to the first and the second electrodes.

6 Claims, 4 Drawing Sheets

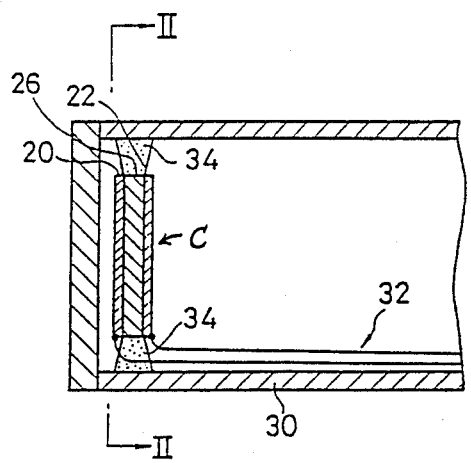 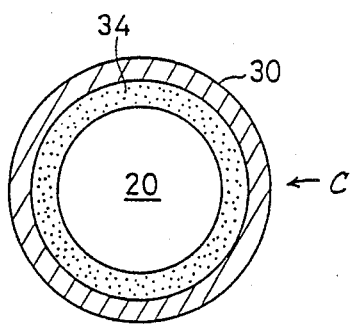

ELECTROSTATIC CAPACITOR TYPE SENSING DEVICE

RELATED APPLICATION

The present application is a continuation-in-part of application Ser. No. 201,786, filed on June 3, 1988 and now abandoned.

BACKGROUND OF THE INVENTION

1. Field of the Invention

This invention generally relates to an electrostatic capacitor type sensing device and more particularly to an electrostatic capacitor type sensing device used for the detection of water level in pools or rivers, the detection of a substance at a tip portion of a hand of a robot, the detection of substances on a belt conveyer in a factory or the like, and so on.

2. Description of the Prior Art

Various types of sensors or detectors have hitherto been developed for the detection of water level, or the detection of substances at a tip portion of a hand of a robot. One of such sensors utilizes the variation in electrostatic capacitance thereof. This sensor detects the existence or an approaching state of an object to be detected by using the variation in distributed capacitance, that is, stray capacitance thereof at the time the object approaches a capacitance portion thereof, with the result that the resonance frequency of a resonance circuit including the capacitance thereof changes.

In such measurement, since it is necessary to set the resonance frequency at a high value, for example, several kilohertz (kHz) to several megahertz (MHz), to increase the accuracy of the detection of an object, the value of the electrostatic capacitance of the sensor, which is a component determining the resonance frequency, should be reduced to an extremely small one. Further, in order to ensure high Q, the electrostatic capacitance of the sensor should be reduced. Usually, the electrostatic capacitance of such a sensor ranges from 0.1 pF to 5 pF. Thus, in a conventional electrostatic capacitance type sensor, a detection electrode 10 facing an object to be detected, a ground electrode 12 facing the detection electrode and an additional electrode 14 facing the ground electrode 12 are arranged in such a manner that there is provided a predetermined space between the electrodes 10 and 12 and another predetermined space between the electrodes 12 and 14, respectively, as shown in FIG. 9. Especially, each of the ground electrode 12 and the additional electrode 14 has a structure that a hollow cylindrical member is arranged in the direction of a common axis thereof such that the side surface of each of the electrodes 10, 12 and 14 does not face that of an adjacent one of the electrodes 10, 12 and 14. If the hollow inside of the ground electrode 12 and that of the additional electrode 14 are filled with synthetic resin or the like, the resonance frequency and the Q of the resonance circuit drop due to the increase in the electrostatic capacitance of the sensor. Thus, when these electrodes 12 and 14 are fixed in a casing of the sensor, the electrodes 12 and 14 are left hollow.

The electrostatic capacitance of the conventional sensors having such structure is small and thus the change of the electrostatic capacitance due to the variation in ambient temperature is small. However, when the sensitivity of a measuring circuit is increased to an extreme extent, even a slight change in the electrostatic capacitance affects the resonance frequency. Thus, in case of such a conventional sensor, it is difficult to sufficiently increase the detection sensitivity thereof. Such ill influence of the change in the electrostatic capacitance due to that in the temperature can be reduced to some extent by adding a capacitor having an inverse temperature characteristic thereto. However, when taking only such a measure, the influence of the change in the electrostatic capacitance is not yet sufficiently reduced. Thus, there have been no effective measures to prevent the lowering of the detection sensitivity due to the change in the temperature.

In order to resolve such a problem, Applicant of the instant application developed a three-electrode sensor provided two capacitors connected with each other in series (that is, a detection capacitor to be used for the detection of phase difference and a comparison capacitor to be used for comparison) which is arranged to supply a.c. signals to these capacitors and measures the change in electrostatic capacitance of the sensor as the change in phase. This three-electrode sensor is disclosed in Japanese Patent Application No. S61-201129 and in the above described related application in detail.

In this three-electrode sensor for phase comparison, the detection capacitor and the comparison capacitor are arranged to have substantially the same structure. Further, this sensor has an arrangement that ambient temperature affects both of the capacitors in a similar manner. Moreover, in this sensor, a symmetrical circuit is formed by connecting both of the capacitors in series and grounding the connection point between the capacitors. Thus, it is considered that this circuit operates in response to the change in ambient temperature such that the balance of stray capacitances of the capacitors is constantly maintained. However, in case of using the apparatus and method for supplying the detection capacitor and the comparison capacitor connected to each other in series and measuring the difference in phase between the capacitors, temperature compensation can be achieved to some extent but errors caused in measurement due to the change in temperature cannot be considerably reduced. For example, when temperature changes from 5° C. to 50° C., the error in measurement is more than 30%. Further, this sensor has a drawback that it is not suited for mass production because there is the necessity of selecting capacitors to be used in order to reduce the difference in performance between the capacitors used in this sensor as well as that of adjusting the positions of the capacitors and so on, for the purpose of improving the precision of measurement.

It is therefore an object of the present invention to provide an electrostatic capacitor type sensing device which can stably effect measurement with extremely little error due to the change in temperature without adjustment of composing elements thereof.

SUMMARY OF THE INVENTION

To achieve the foregoing object, the sensing device of the present invention does not use two capacitors connected to each other in series as a sensing portion but employs a single capacitor. That is, the sensing device of the present invention is provided with a sensing portion which is composed of two conductors and a dielectric member interposed between these conductors as a spacer. Further, in the sensing device according to the present invention, a.c. signals are supplied to this capacitor and further the difference in phase of the a.c.

signal is detected increasing a common mode rejection ratio at both ends of the capacitor.

Thus, in accordance with the present invention, there is provided an electrostatic capacitance type detecting device which includes a first electrode placed in the proximity of an object to be measured, a second electrode placed in the proximity of the first electrode, a film like dielectric means interposed between the first and the second electrodes, a first resistor one end of which is connected to one end of the first electrode, a second resistor one end of which is connected to one end of the second electrode, an a.c. signal generator connected to the other ends of the first and the second resistors and to the ground and a phase difference detecting means connected to the first and the second electrodes.

In the device of the present invention, one of the electrodes or conductors composing the capacitance is arranged to be close to the object to be measured. At that time, stray capacitance of the conductor (that is, a detection electrode) placed closer to the object than the other increases and thus, the balance of stray capacitances of the electrodes, which should be equal to each other due to the symmetry of the circuit, is lost. As a result of this, there occurs difference in phase between the conductors or electrodes. By detecting this difference, it can be not only determined whether or not an object is present but also evaluated how long the distance between the detection electrode and the object is. When ambient temperature changes, the electrostatic capacitance of the dielectric also varies but there occurs no difference in phase because of the facts that an a.c. power source is symmetrically connected to both of the electrodes which are thus coupled to each other in an alternating manner and that the change in stray capacitance due to the change in temperature equally occurs at each of the electrodes. Thus, in a wide range of temperature, errors in measurement can be extremely reduced and namely accurate measurement can be performed.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which:

FIG. 1 is a side cross-sectional view of a sensing portion of an electrostatic capacitance type sensing device embodying the present invention;

FIG. 2 is a cross-sectional view taken on line II—II of FIG. 1;

DETAILED DESCRIPTION OF PREFERRED EMBODIMENT

Figure 3:
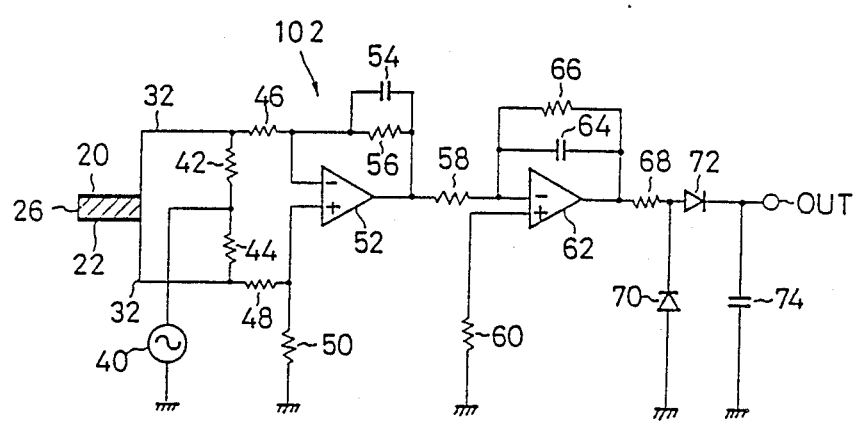
FIGS. 3 and 4 are circuit diagrams each showing an example of a circuit for processing outputs of the sensing portion of the electrostatic capacitance type sensing device of the present invention and measuring a distance to an object to be detected.

Hereinafter, a preferred embodiment of the present invention will be described by referring to the accompanying drawings.

FIG. 1 shows a side cross-sectional view of a sensing portion of the electrostatic capacitance type sensing device according to the present invention. Further, FIG. 2 shows a cross-sectional view taken on line II—II of FIG. 1. As shown in these figures, this sensing portion includes a capacitor assembly C of three-layer structure, which is received in a casing 30 made of a synthetic resin or the like. Further, a supporting member 34, which may be made of a synthetic resin such as an epoxy resin or the like, is used for fixedly mounting the capacitor assembly C to the casing 30. More specifically, the capacitor assembly C has three-layer sandwich lamination structure composed of two sheets of metallic foil 20 and 22 such as copper foil and a sheet of plate like or film like dielectric substrate 26 made of glass cloth, epoxy substrate, Teflon ("Teflon" is the trade mark for polytetrafluoroethylene), polyimide or the like. These metallic foil sheets 20 and 22 are either adhered to or deposited through chemical processing, vapor deposition, sputtering or the like to the substrate 26. Further, the metallic foil sheets 20 and 22 are a detection electrode (that is, a first electrode) and a compensation or comparison electrode (that is, a second electrode), respectively. As shown in FIG. 1, the metallic foil sheet 20 is provided at the side of an end of the casing 30 and is thus arranged to be closer to an external object than the metallic foil sheet 22. Furthermore, a lead wire 32 is connected to an end of each of the metallic foil sheets 20 and 22. As to the material of the dielectric substrate 26, may be used a thin plate of other synthetic resin, ceramic glass or the like. However, in case where the dielectric substrate is not like a plate but is bent as will be described hereinlater, a flexible substrate such as made of polyimide is preferable. Further, in such a case, the thickness from 50 micrometers ($\mu$m) to 100 $\mu$m is most preferable. Moreover, even in case where the dielectric substrate 26 is not bent, the thickness thereof is preferably on the order of 1 millimeter (mm) to 2 mm in view of capacitance and heat conductivity. For example, the thickness of the dielectric substrate 26 of the embodiment shown in FIG. 1 is 1.6 mm.

Although the capacitor assembly C of the embodiment of FIG. 1 has a circular traversal section as shown in FIG. 2 and is received in the cylindrical casing 30, the shape of the traversal section of the capacitor assembly C is not limited to a circular one and a desired shape thereof may be selected from a polygonal one, an ellipsoidal one and so forth. Assuming that the traversal section of the capacitor assembly C has a circular shape and a diameter of 3 centimeters (cm), the capacitance of the capacitor assembly C can range from several pFs to several tens pFs depending on the thickness of the dielectric substrate 26. Further, the capacitor assembly C is not secured by using filler but end portions thereof are fixed by the supporting member 34 to the casing 30 to be tough enough against external impacts. Incidentally, if filler of some kind is used under certain conditions, the filler may be peeled off from the surface of the capacitor assembly C owing to thermal expansion thereof.

Figure 4:
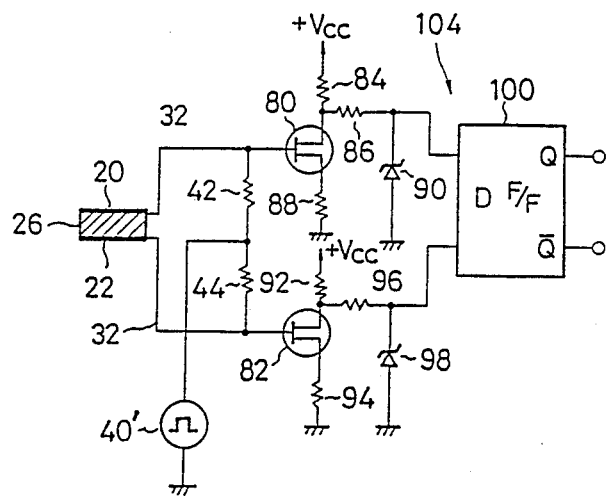

The sensing portion shown in FIGS. 1 and 2 is connected to an a.c. power source comprising an a.c. signal generator through two resistors and further to a phase difference means. When using this detecting device, the end (that is, the left end, as viewed in FIG. 1,) of the casing 30 is arranged at a position which an object (not shown) to be detected can approach. In FIGS. 3 and 4, reference numeral 40 indicates an a.c. power source; 42, 44, 46, 48, 50, 56, 58, 60, 68, 84, 86, 88, 92, 94 and 96 resistors; 52 and 62 operational amplifiers; 54, 64 and 74 capacitors; 66 a variable resistor; 70 and 72 diodes; 80 and 82 field-effect transistors (FETs); 90 and 98 Zener diodes; 100 a D-flipflop; and 102 and 104 phase difference detecting means. Further, a set of the operational amplifier 52, the capacitor 54 and the resistor 56 and another set of the operational amplifier 62, the capacitor 64 and the variable resistor 66 compose low-pass filters, respectively.

Describing the circuit of FIG. 3 first, a.c. current, of which the frequency is 3 kHz, is fed through resistors 42 and 44 to the first electrode (that is, the detection electrode) 20 and the second electrode (that is, the comparison electrode) 22 of the capacitor assembly C, respectively. Further, thermistors, metal film resistors, carbon resistors or any combination of these elements may be used as the resistors 42 and 44, respectively. In such a case, it is preferable in view of temperature compensation that the resistors 42 and 44 are arranged to be positioned in the vicinity of the capacitor assembly C.

When the detection electrode 20 is not in the proximity of the object, the stray capacitance of the detection electrode 20 is equal to that of the comparison electrode 22 and thus the phase of the current flowing through the detection electrode 20 is equal to that of the current flowing through the detection electrode 22. Therefore, the potentials at inverting (−) input and noninverting input (+) input of the operational amplifier 52 are equal to each other. As a result, the output of the amplifier 52 becomes zero. Further, the output of the operational amplifier 62 at the next stage and that of the output terminal OUT also becomes zero. When the object approaches the detection electrode 20, the stray capacitance of the detection electrode 20 increases so that the symmetry or balance of the stray capacitance of the electrodes in the capacitor assembly C is lost. Thus, the current flowing into the detection electrode 20 lags that flowing into the comparison electrode 22. Consequently, there occurs difference in phase between the inverting and the noninverting signals inputted to the operational amplifiers 52. Further, d.c. current corresponding to the phase difference between the input signals to the amplifiers 52 is outputted from the output terminal OUT. Therefore, by monitoring this output signal, the presence of the object, the distance to the object and so on can be detected. Incidentally, the variable resistor 66 is used to regulate the detection sensitivity in response to the kind of the object and the position to which the sensing device is placed.

If the ambient temperature has risen, the volume of the dielectric member 26 increases due to thermal expansion so that the thickness thereof also increases. As a result, the electrostatic capacitance of the capacitor assembly C decreases. However, there occurs no phase difference even when thermal expansion of the dielectric member 26. This is because the electrodes 20 and 22 of the capacitance assembly C are connected to the inverting and the noninverting inputs of the operational amplifier 52, respectively. Therefore, temperature compensation is readily achieved so that the occurrence of detection error due to the change in electrostatic capacitance, which is caused by the change in ambient temperature, can be prevented.

In case of the circuit of FIG. 4, a pulse generating source 40' is used in place of the a.c. power source 40 of FIG. 3. Further, similarly as in case of the circuit of FIG. 3, it is preferable that the frequency of pulses generated by the source 40' is like 3 kHz or so. When the stray capacitance of the detection electrode 20 is equal to that of the comparison electrode 22, pulses to be inputted into an FET 80 is made to lead pulses to be inputted to another FET 82 by changing the ratio of the resistance of the resistor 42 to that of the resistor 44. When the object approaches the electrode 20, the stray capacitance between the electrode 20 and the ground increases so that there occurs delay in the rise of the pulses and thus the leading edge of the pulse, which would rise upright when the stray capacitance does not change, slopes. Thus, outputs Q and Q of a D-flipflop 100 are inverted if the operating time of the FET 80 is longer than the rise time of the pulses inputted thereto.

Incidentally, as a result of measurement effected by using the electrostatic capacitance type sensing device and varying temperature from 0° to 90° C., the error of measurement is within 10%.

Figure 5:
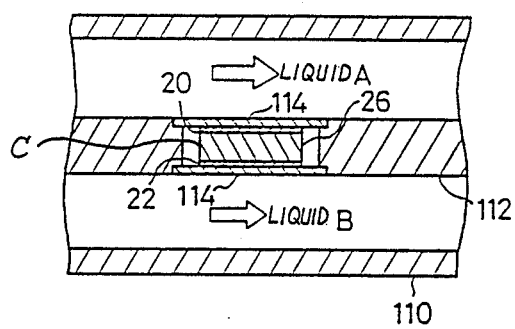
FIGS. 5 thru 7 are diagrams for illustrating examples of the application of the present invention.

Next, examples of the application of the electrostatic capacitance type sensing device of the present invention will be described hereinbelow. FIG. 5 shows a cross-section of a device for measuring the dielectric constant of liquid. This device is provided with a partition 112 at the center of a pipe 110. Further, a through-hole is bored in the partition 112 and the capacitor assembly C of the sensing portion of FIG. 1 is mounted thereto. In this figure, reference numeral 114 indicates transparent partitions which are provided at both ends of the through-hole of the partition 112 to cover the through-hole. Moreover, the capacitor assembly C is interposed between the two partitions 114. In the pipe 110, it is arranged that liquid A to be measured is flown above the partition 112 while standard liquid B having known dielectric constant is flown under the partition 112. The difference in dielectric constant between both of the liquids A and B can be measured by the measuring circuit of FIGS. 3 and 4 using the phase difference.

Figure 6:
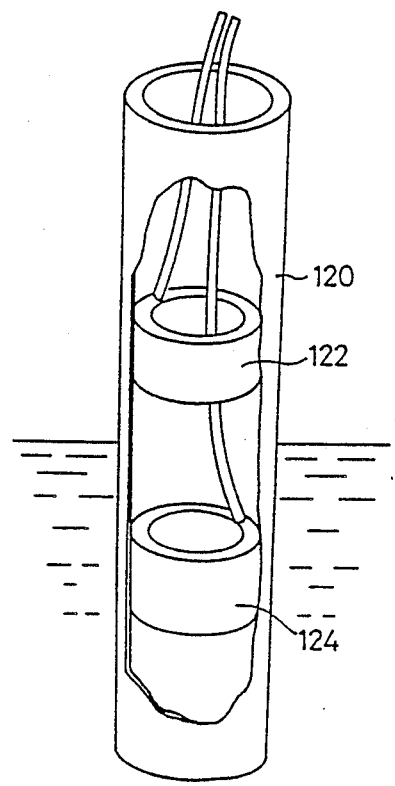
Figure 7:
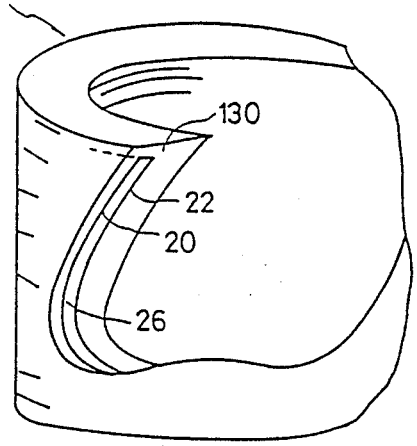
Figure 9:
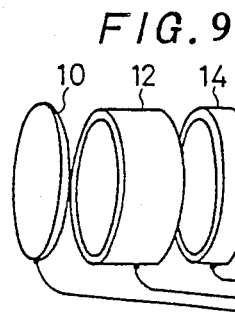
FIG. 9 is a perspective view of a sensing portion of a conventional device.

FIG. 6 shows another example of the application of the sensing device of the present invention shown in FIG. 1 to a water gauge. This water gauge is arranged such that two capacitor assemblies 122 and 124 are mounted in the hollow portion of a pipe made of vinyl chloride or the like. FIG. 7 shows a partial cross-sectional perspective view of the capacitor assemblies 122 and 124. Further, the capacitor assemblies 122 and 124 are manufactured by covering the capacitor having the three-layer structure shown in FIG. 1 with a covering member 130. Moreover, cylindrical capacitor assemblies 122 and 124 are formed by using flexible film like material such as polyimid as the dielectric member 26.

When water level rises and thus water approaches a portion around the lower capacitor assembly 124, this can be detected by sensing the phase difference occurring due to the increase of the stray capacitance of the lower capacitor assembly 124 in the same manner as described with reference to FIGS. 3 and 4. When the water level further rises, this can be also detected by using the upper capacitor assembly 122 in the same manner.

Although an outer electrode of each of the capacitor assemblies 122 and 124 is used in the examples of FIGS. 6 and 7 as a detection electrode, an inner electrode of each thereof can be used as a detection electrode. In such a case, the cylindrical capacitor assembly is arranged around an object to be detected.

Furthermore, the present invention can be applied to measurement of a large object. For measuring a large object, the device of the present invention employs a film like capacitor assembly, of which the width and the height are on the order of several tens centimeters to several meters and which can be attached to the surface of the casing, of the sensing portion. Although the electrostatic capacitance becomes large to a considerable extent, a desired temperature compensation characteristic can be obtained independent of the magnitude of the the electrostatic capacitance.

As is apparent from the foregoing description, in the electrostatic capacitance type sensing device of the present invention, a capacitor assembly having a simple three-layer structure is used as a sensor of phase difference type. Further, an a.c. power source is connected to both of the electrodes of the capacitor assembly through two resistors without neutral grounding and a phase difference detecting means for detecting the difference in phase between the electrodes is provided thereto. Thereby, the influence of the change in ambient temperature can be cancelled or compensated. Thus, in contrast with the fact that the conventional electrostatic capacitance type sensing device effects detection stably only in narrow range of temperature, there can hardly occur detection error even when the change in temperature is large, and stable detection can be performed and a good sensitivity can be obtained even at a high temperature such as 90° C. or so in case of the electrostatic capacitance type sensing device of the present invention.

Figure 8:
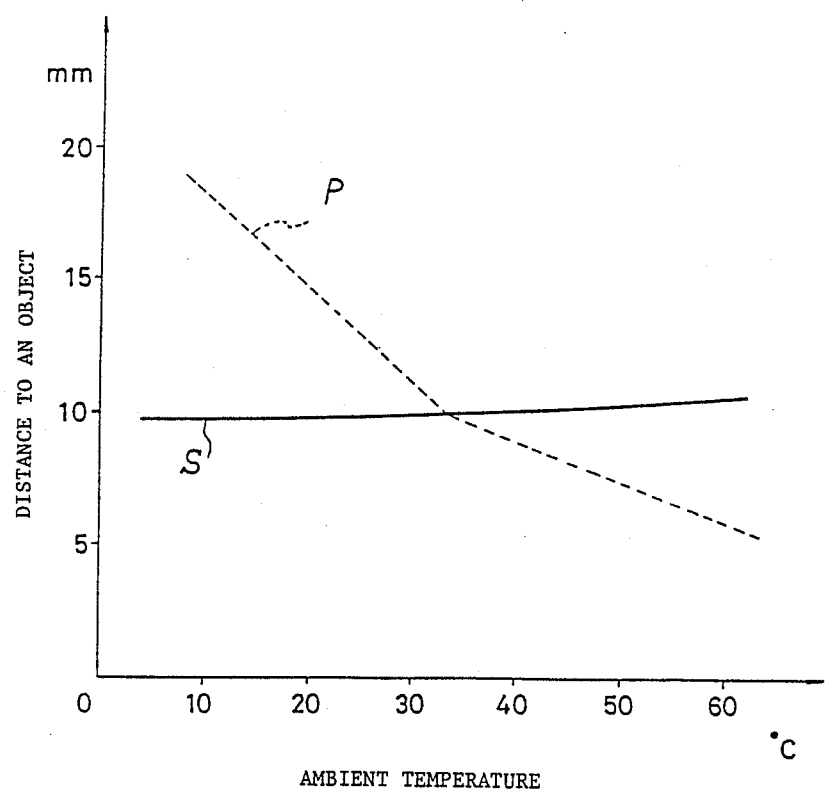
FIG. 8 is a graph showing the relation between the distance to an object and the ambient temperature in cases of using the electrostatic capacitance type sensing device of the present invention and using a sensor of five-layer structure including two capacitors connected to each other in series which Applicant of the instant application developed prior to the present invention.

FIG. 8 is a graph showing the relation between the measured value of the distance to an object and the change in ambient temperature. In this figure, a dotted curve P indicates the result of measurement by using the sensing device having two capacitors connected to each other in series and on the other hand a solid curve S indicates that of measurement by using the sensing device of the present invention. As is seen from this figure, the influence of the change in ambient temperature can be effectively reduced. Thus, it is possible to raise the sensitivity to twice or three times that of the conventional sensors and further periodic calibration becomes unnecessary.

Furthermore, assuming that the electrostatic capacitance of the capacitor assembly C is $\tau$ pF and the angular frequency of the a.c. current supplied thereto is $\omega$, the impedance thereof is $(1/\omega \tau)$. Thus, the sensing device of the present invention can considerably attenuate unnecessary high-frequency noises but does not attenuate signals having the frequency of several kHz so much, thereby obtaining high gain. Additionally, the sensing device of the present invention uses a single capacitor in the sensing portion thereof. Thus, it has become unnecessary to prepare two capacitors for detection and comparison which are of substantially the same specification thereby resolving the above described problem of productivity of the device disclosed in the related application above. Further, the sensing device of the present invention employs the phase difference detecting method and performs temperature compensation thereby making the size thereof large and freely changing the configuration and arrangement thereof in accordance with objects and conditions of measurement. Moreover, the sensing device of the present invention has an advantage that it can be easily mass-produced as electronic parts such as semiconductors because of the lamination structure of the sensing portion thereof. Furthermore, in the sensing device of the present invention, the supporting member is used for fixing the capacitor assembly in the casing of the sensing portion in place of filling the inside of the casing with filler made of synthetic resin, thereby being free from the ill influence of thermal expansion of the filler.

While a preferred embodiment of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. An electrostatic capacitance type sensing device comprising:
    a first electrode to be placed in the proximity of an object to be measured;
    a second electrode placed in the proximity of said first electrode;
    a film like dielectric spacer means interposed between said first and said second electrodes;
    a first resistor, one end of which is connected to one end of said first electrode;
    a second resistor, one end of which is connected to one end of said second electrode;
    an a.c. signal generator connected to the other ends of said first and the second resistors and to the ground; and
    a phase difference detecting means connected to said first and the second electrodes.

2. An electrostatic capacitance type sensing device as claimed in claim 1, wherein said film like dielectric means interposed between said first and second electrodes is made of glass cloth, epoxy substrate, Teflon or polyimide.

3. An electrostatic capacitance type sensing device as claimed in claim 1, wherein the thickness of said film like dielectric means is equal to or less than 2 mm.

4. An electrostatic capacitance type sensing device as claimed in claim 1, wherein the thickness of said film like dielectric means is in the order of 50$\mu$ to 100$\mu$.

5. An electrostatic capacitance type sensing device as claimed in claim 1, wherein each of said first and said second electrodes is copper foil adhered closely to said film like dielectric means.

6. An electrostatic capacitance type sensing device as claimed in claim 1, wherein each of said first and said second electrodes and said film like dielectric means are fixed by a supporting means at the peripheral portions thereof to a hollow cylindrical casing and further said first electrode is arranged in the proximity of one end of said casing.

* * * * *